US012025338B2

(12) United States Patent
Cheng et al.

(10) Patent No.: US 12,025,338 B2
(45) Date of Patent: Jul. 2, 2024

(54) NOISE CANCELLATION BASED ON AIRFLOW GENERATOR OPERATIONAL SPEED

(71) Applicant: HEWLETT-PACKARD DEVELOPMENT COMPANY, L.P., Spring, TX (US)

(72) Inventors: Chao-Wen Cheng, Taipei (TW); Tsung-Yen Chen, Taipei (TW); Chien Fa Huang, Taipei (TW); Wen Shih Chen, Taipei (TW); Mo-Hsuan Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 17/805,996

(22) Filed: Jun. 8, 2022

(65) Prior Publication Data

US 2023/0400220 A1 Dec. 14, 2023

(51) Int. Cl.

| | |
|---|---|
| ***F24F 13/24*** | (2006.01) |
| ***G06F 1/20*** | (2006.01) |
| ***G10K 11/178*** | (2006.01) |

(52) U.S. Cl.

CPC ........ *F24F 13/24* (2013.01); *G10K 11/17823* (2018.01); *F24F 2013/247* (2013.01)

(58) Field of Classification Search

CPC ................ F24F 13/24; F24F 2013/247; G10K 11/17823; G10K 11/1781; G10K 11/178; G10K 11/17879; G10K 11/17881; G10K 11/17883; G06F 1/20; G06F 1/203; G06F 1/206

See application file for complete search history.

(56) References Cited

U.S. PATENT DOCUMENTS

| | | | | |
|---|---|---|---|---|
| 5,448,645 A | | 9/1995 | Guerci | |
| 6,049,615 A | * | 4/2000 | Chou | G10K 11/17881 381/336 |
| 9,304,520 B2 | * | 4/2016 | Cheng | G05D 23/1919 |

(Continued)

FOREIGN PATENT DOCUMENTS

| | | | | |
|---|---|---|---|---|
| CN | 112509546 A | * | 3/2021 | G10K 11/178 |
| EP | 3696644 A1 | * | 8/2020 | G05D 23/1919 |

(Continued)

OTHER PUBLICATIONS

Anil, Acoustic Fan Noise Cancellation in a Laptop Microphone System, Master Thesis, Electrical Engineering, Mar. 2012 (72 pages).

(Continued)

*Primary Examiner* — Edgardo San Martin
(74) *Attorney, Agent, or Firm* — Knobbe, Martens, Olson & Bear, LLP

(57) ABSTRACT

In some examples, an electronic device includes an audio output device, an airflow generator to generate an airflow, and a system controller to control an operational speed of the airflow generator. The electronic device further includes an audio controller to generate a noise cancellation audio output based on an indicator of the operational speed of the airflow generator provided from the system controller to the audio controller, and send the noise cancellation audio output to the audio output device to mitigate noise produced by the airflow generator.

15 Claims, 3 Drawing Sheets

(56) References Cited

U.S. PATENT DOCUMENTS

| | | | | |
|---|---|---|---|---|
| 11,293,457 B2 * | 4/2022 | Li | F04D 29/662 | |
| 11,631,391 B1 * | 4/2023 | Tu | G10K 11/17854 | 381/56 |
| 2008/0187147 A1 * | 8/2008 | Berner | G10K 11/17823 | 381/71.3 |
| 2010/0028134 A1 * | 2/2010 | Slapak | G10K 11/17853 | 415/119 |
| 2010/0080399 A1 * | 4/2010 | Pfau | B60H 1/00828 | 381/71.4 |
| 2012/0300954 A1 * | 11/2012 | Ku | G10K 11/17857 | 381/71.1 |
| 2022/0383847 A1 * | 12/2022 | Chen | G10K 11/17825 | |

FOREIGN PATENT DOCUMENTS

| | | | |
|---|---|---|---|
| KR | 20080013176 A * | 2/2008 | |
| WO | WO-0251228 A2 * | 6/2002 | G06F 1/206 |

OTHER PUBLICATIONS

Minogue et al., Adaptively Cancelling Server Fan Noise, Analog Dialogue, Mar. 2000 (15 pages).

Sharma et al., CPU Fan Noise Control by Active Noise Cancellation, International Research Journal of Engineering and Technology (IRJET), Feb. 2016 (4 pages).

Wikipedia, Audio codec last edited May 3, 2022 (2 pages).

Wikipedia, Pulse-width modulation last edited Mar. 17, 2022 (11 pages).

* cited by examiner

NOISE CANCELLATION BASED ON AIRFLOW GENERATOR OPERATIONAL SPEED

BACKGROUND

An electronic device can include an airflow generator to produce an airflow to cool a region in the electronic device. As examples, the electronic device may include electronic components that can produce heat during operation. Examples of electronic components include central processing units (CPUs), general processing units (GPUs), memory devices, input/output (I/O) devices, and so forth.

If the heat generated by such electronic components are not dissipated adequately, a temperature rise in the electronic device may cause damage to the electronic device, and/or may cause discomfort to a user who may come into contact with a hot surface of the electronic device.

BRIEF DESCRIPTION OF THE DRAWINGS

Some implementations of the present disclosure are described with respect to the following figures.

Figure 1:
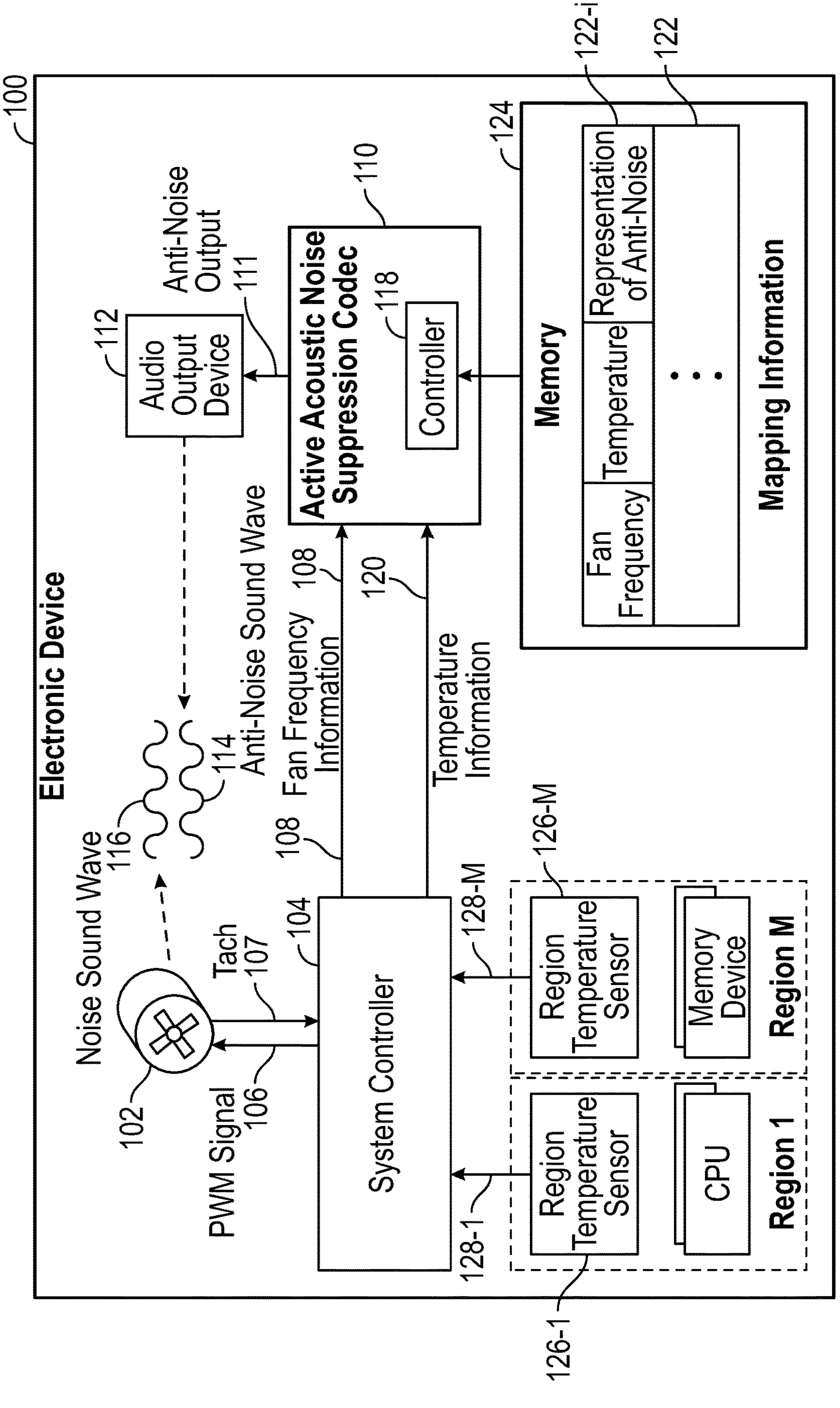
FIG. 1 is a block diagram of an arrangement of components in an electronic device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An electronic device can include a collection of airflow generator generators (a "collection" can refer to a single airflow generator or multiple airflow generators) that can produce airflow to dissipate heat in the electronic device. When an operational speed of an airflow generator is high, the airflow generator can produce a greater amount of noise that may be noticeable to a user. For example, the airflow generator can include a fan that has a rotational speed. As the rotational speed of the fan increases, the noise produced by the fan can correspondingly increase.

Although reference is made to fans as examples of airflow generators in the present discussion, it is noted that in other examples, different types of airflow generators may be used in an electronic device. For example, an airflow generator can include a fluid pump to force a fluid flow, such as a flow of a liquid or a gas, through a conduit to carry cooling fluid to a target region in the electronic device. The flow of cooling fluid in the conduit can carry heat away from the target region in the electronic device. In such examples, the operational speed of the airflow generator can refer to a rate at which fluid is pumped by the airflow generator.

In some examples, an audio sensor, such as a microphone, can be used to detect noise produced by an airflow generator. The noise detected by the audio sensor can then be used to produce "anti-noise," which is an audio sound wave configured to cancel or mitigate the noise produced by the airflow generator. In some examples, the anti-noise can include a sound wave having the same amplitude as a noise sound wave, but with a phase that is opposite the phase (e.g., 180° out of phase) of the noise sound wave. In this manner, the anti-noise can cancel or mitigate the effect of the noise sound wave, such that the noise produced by operation of the airflow generator is less noticeable or bothersome to a user of the electronic device.

However, relying on use of an audio sensor such as a microphone to implement noise mitigation for an airflow generator can add to the overall cost of the electronic device. The audio sensor for noise mitigation is an extra component that has an associated added cost. In some cases where there are multiple airflow generators, multiple audio sensors may have to be included in the electronic device, which further adds to the overall cost of the electronic device.

In accordance with some implementations of the present disclosure, a noise mitigation system does not rely on audio sensor(s) to measure noise produced by airflow generator(s). The noise mitigation system according to some implementations of the present disclosure can omit audio sensor(s) for detecting airflow generator noise.

In some examples according to the present disclosure, the noise mitigation system estimates a noise produced by an airflow generator based on input information that is different from measurements of audio sensor(s). Based on the estimated noise from the noise detection mechanism, the noise mitigation system can produce a noise cancellation audio output, which is referred to as "anti-noise," to mitigate the effect of airflow generator noise.

In some examples, the input information used by the noise mitigation system can include an indicator of an operational speed of the airflow generator. The noise mitigation system can map the operational speed of the airflow generator to a corresponding anti-noise output that is sent to an audio output device to produce a corresponding anti-noise. In further examples, the input information can additionally include temperature information of a temperature in a region (or multiple temperatures in different regions) of the electronic device. The noise mitigation system can map the operational speed of the airflow generator and the temperature to a corresponding anti-noise output that is sent to the audio output device for producing an anti-noise.

FIG. 1 is a block diagram of an electronic device 100. Examples of electronic devices can include any or some combination of the following: a desktop computer, a notebook computer, a tablet computer, a server computer, a communication node, a storage system, a vehicle or a module of the vehicle, a home appliance, and so forth.

The electronic device 100 includes an airflow generator 102, which can be in the form of a fan, for example. In other examples, the airflow generator 102 can include a fluid pump to pump fluid through a conduit to a target region to cool a portion of the electronic device 100.

In the ensuing discussion, reference is made to the airflow generator 102 as a fan 102. It is noted that techniques or mechanisms according to some implementations of the present disclosure can be applied for other types of airflow generators.

Also, although FIG. 1 shows an example with one fan 102, in other examples, the electronic device 100 may include multiple fans (or more generally, multiple airflow generators).

The electronic device 100 includes a system controller 104 that controls an operation of the fan 102, including turning on or off the fan 102 as well as controlling an operational speed of the fan 102. In the context of a fan, the operational speed of the fan can refer to a rotational speed of the fan, which corresponds to a rotation of fan blades that generate a cooling airflow.

In some examples, the system controller 104 controls the fan speed by outputting a pulse width modulation (PWM) signal 106 to the fan 102. A "PWM signal" can refer to a signal that oscillates at periodic time intervals. In each time interval, the PWM signal has an "on" duration and an "off" duration. An "on" duration of the PWM signal refers to a time duration within the time interval when the PWM signal is at the on or asserted state (active high or low), and the "off" duration can refer to a time duration during within the time interval when the PWM signal is at the off or deasserted (inactive low or high).

By varying the ratio of the "on" duration and the "off" duration, the PWM signal 106 can control a rotational speed of the fan 102. A higher ratio of the "on" duration with respect to the "off" duration can cause of the fan 102 to operate at a higher rotational speed. A lower ratio of the "on" duration with respect to the "off" duration can cause a lower rotation speed of the fan 102.

In some examples, the system controller 104 can be in the form of a super input/output (I/O) chip, which is a control device that is used for controlling various different I/O devices in the electronic device 100. As examples, in addition to controlling an operation of an airflow generator, the super I/O chip can include interfaces to a keyboard and/or a pointer device (e.g., a mouse device), can receive measurements from various sensors, can include an embedded controller, and so forth. In other examples, the system controller 104 can be implemented using other types of controllers.

As used here, a "controller" can refer to a hardware processing circuit, which can include any or some combination of a microprocessor, a core of a multi-core microprocessor, a microcontroller, a digital signal processor (DSP), a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

The fan 102 provides a tachometer measurement 107 to the system controller 104. The tachometer measurement 107 is provided by a tachometer of the fan 102, and the tachometer measurement 107 specifies a rotational speed of the fan 102 (e.g., rotations per minute or another unit time).

Based on the tachometer measurement 107, the system controller 104 provides fan frequency information 108 to an active acoustic noise suppression coder/decoder (codec) 110. The fan frequency information 108 can include the rotational speed of the fan 102 indicated in the tachometer measurement 107.

The active acoustic noise suppression codec 110 is an example of the noise mitigation system noted above. The active acoustic noise suppression codec 110 is an audio codec that can encode or decode digital audio data to produce an analog audio output that can be provided to an audio output device 112 of the electronic device 100. The audio output device 112 can produce an audio output based on the analog audio output signal. In some examples, the audio output device 112 includes a speaker.

More specifically, the active acoustic noise suppression codec 110 provides an analog anti-noise output 111 to the audio output device 112, which produces an anti-noise based on the anti-noise output 111.

The anti-noise produced by the audio output device 112 is represented by an anti-noise soundwave 114. The anti-noise soundwave 114 is configured to cancel or mitigate a noise soundwave 116 representing noise produced by operation of the airflow generator 102. In some examples, the anti-noise soundwave 114 has the same amplitude as the noise soundwave 116, but the anti-noise soundwave 114 is 180° out of phase with respect to the noise soundwave 116.

The active acoustic noise suppression codec 110 includes a controller 118 that can receive input information from the system controller 104. The controller 118 produces the anti-noise output 111 based on the input information from the system controller 104. The input information includes the fan frequency information 108. In some examples, the input information can also include temperature information 120 that indicates a temperature in a region of the electronic device 100 (or temperatures in multiple regions of the electronic device 100).

The controller 118 can map the input information (including the fan frequency information 108 and possibly the temperature information 120) to the anti-noise output 111 that is provided by the active acoustic noise suppression codec 110 to the audio output device 112.

In some examples, the mapping performed by the controller 118 can be based on mapping information 122 stored in a memory 124. The memory 124 can be implemented using any or some combination of the following storage devices: a memory device, a disk-based storage device, a solid-state drive, and so forth.

The mapping information 122 includes multiple entries, where each mapping information entry 122-*i* (i=1 to N, where N≥1 represents a quantity of mapping information entries in the mapping information 122) maps a fan frequency and a temperature to a corresponding representation of an anti-noise.

In other examples, if temperature information is not considered by the controller 118 in producing an anti-noise output, the mapping information 122 can map fan frequencies to corresponding representations of anti-noise.

In some examples, the mapping information 122 can be in the form of a lookup table including the mapping information entries 122-1 to 122-N. The controller 118 performs a lookup of the lookup table based on the input information provided by the system controller 104. The input information maps to one of the mapping information entries 122-1 to 122-N. The controller 118 obtains the representation of the anti-noise from the mapped entry of the lookup table, and the active acoustic noise suppression codec 110 produces the anti-noise output 111 using the representation of the anti-noise from the mapped entry.

The representation of anti-noise included in each mapping information entry 122-*i* can include information that is useable by the controller 118 to produce a corresponding anti-noise output. For example, the representation of anti-noise can describe the waveform for the anti-noise, or can be a value or other indicator that maps to a corresponding anti-noise output.

The mapping information entries of the mapping information 122 can be populated based on collecting empirical data. For example, during an experiment, the fan 102 can be operated at different fan rotational speeds, and an audio sensor (e.g., a microphone) can be used to measure the noise produced by the fan 102 at each fan rotational speed. The measured noise can then be used to derive the representation of anti-noise that populates a corresponding mapping information entry.

In further examples, in addition to measuring noise at different fan rotational speeds, temperature measurements can also be acquired from temperature sensor(s) in the electronic device 100. The combination of a fan rotational speed and a temperature from a temperature sensor can correlate to a measured noise—this correlation of fan rotational speed and temperature can be mapped to a representation of anti-noise in a corresponding mapping information entry of the mapping information 122.

In some examples, the electronic device 100 can include various region temperature sensors 126-1 to 126-M, where M 1. Each region temperature sensor 126-*j* (j=1 to M) can be used to measure a temperature in a corresponding region i. For example, in FIG. 1, the region temperature sensor 126-1 measures a temperature in region 1, and the region temperature sensor 126-M measures a temperature in region M.

In some examples, region 1 is where CPU(s) is (are) placed, and region M is where memory device(s) is (are) placed. More generally, different regions can include different electronic components. Different types of electronic components can Each region temperature sensor 126-*i* provides a corresponding temperature measurement 128-*i* to the system controller 104. The temperature information 120 provided by the system controller 104 to the active acoustic noise suppression codec 110 can include information of temperatures measured by the respective region temperature sensors 126-1 to 126-M.

The temperature included in each mapping information entry 122-*i* of the mapping information 122 is a region temperature measured by a corresponding region temperature sensor 126-*j*.

If the temperature information 120 provided by the system controller 104 to the active acoustic noise suppression codec 110 includes multiple region temperatures from multiple region temperature sensors 126-1 to 126-M, then the multiple region temperature in combination with a fan frequency can map to multiple respective mapping information entries in the mapping information 122. The multiple respective mapping information entries can include different representations of anti-noise that correspond to different anti-noises. In such examples where the input information maps to multiple respective mapping information entries, the controller 118 can combine (e.g., average, sum, etc.) the representations of anti-noise to produce the anti-noise output 111.

Figure 2:
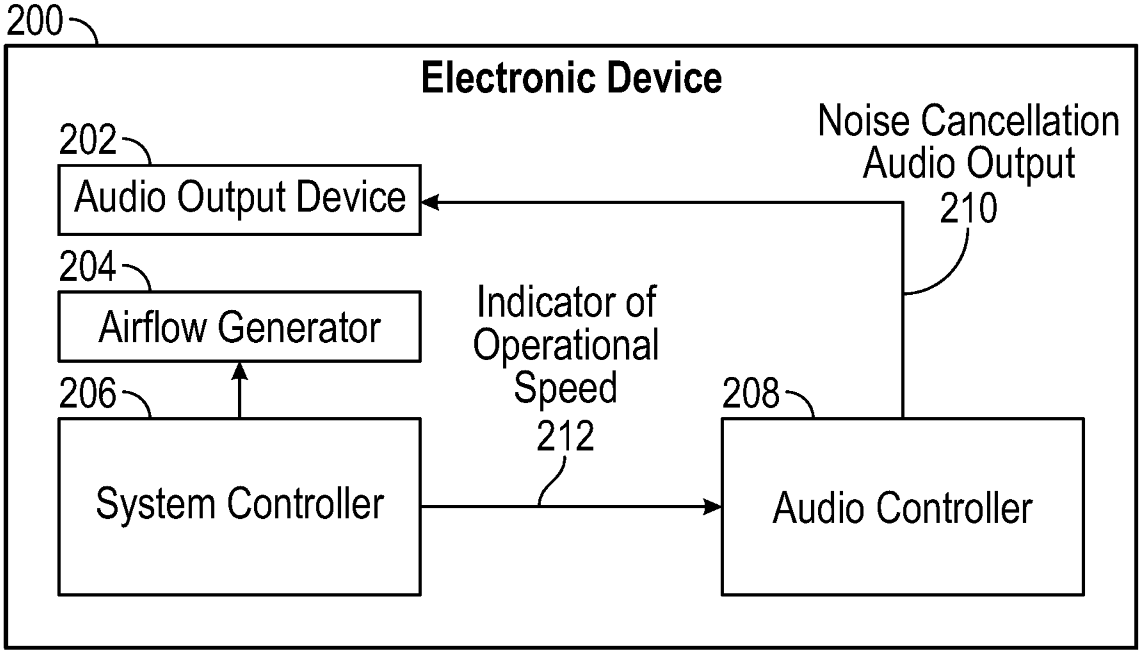
FIG. 2 is a block diagram of an electronic device according to some examples.

FIG. 2 is a block diagram of an electronic device 200 according to further examples. The electronic device 200 includes an audio output device 202 and an airflow generator 204 to generate an airflow.

The electronic device 200 further includes a system controller 206 to control an operational speed of the airflow generator 204. The system controller 206 may be similar to the system controller 104 of FIG. 1 in some examples.

The electronic device 200 further includes an audio controller 208 that provides an output to the audio output device 202. The audio controller 208 can be part of the active acoustic noise suppression codec 110 of FIG. 1 in some examples.

The audio controller 208 generates a noise cancellation audio output 210 based on an indicator 212 of the operational speed of the airflow generator 204 provided from the system controller 206 to the audio controller 208.

The audio controller 208 sends the noise cancellation audio output 210 to the audio output device 202 to mitigate noise produced by the airflow generator 204 during operation of the airflow generator 204.

In some examples, the indicator 212 of the operational speed of the airflow generator 204 includes information of a frequency of operation of the airflow generator 204. In some examples, the indicator 212 of the operational speed of the airflow generator 204 can be based on a measurement by the airflow generator 204, such as a tachometer measurement similar to 107 in FIG. 1. If the airflow generator 204 includes a fan, then the indicator 212 of the operational speed of the airflow generator 204 includes information of a frequency of rotation of the fan.

In some examples, the system controller 206 controls the operational speed of the airflow generator 204 by adjusting a PWM of a signal provided to the airflow generator 204.

In some examples, in response to the indicator 212 of the operational speed of the airflow generator 204, the audio controller 208 accesses mapping information (e.g., 122 in FIG. 1) that maps different airflow generator operational speeds to respective representations of noise cancellation audio outputs.

In some examples, a storage (e.g., the memory 124 of FIG. 1) stores the mapping information, where the storage is pre-populated with the mapping information.

In some examples, in response to the indicator 212 of the operational speed of the airflow generator 204 and temperature information, the audio controller 208 accesses mapping information that maps different combinations of airflow generator operational speeds and temperatures to respective representations of noise cancellation audio outputs. The operational speed of the airflow generator 204 indicated by the indicator 212 and the temperature of the temperature information are mapped by the mapping information to the noise cancellation audio output sent to the audio output device 202.

In some examples, the system controller 206 receives region temperature measurements from multiple region temperature sensors that measure temperatures in different regions. The system controller 206 provides multiple temperatures of the region temperature measurements to the audio controller 208. The audio controller 208 generates a noise cancellation audio output based on the multiple temperatures.

In some examples, a first temperature maps to a first noise cancellation audio output, and a second temperature maps to a second noise cancellation audio output. The audio controller 208 generates the noise cancellation audio output provided to the audio output device 202 by combining (e.g., averaging, summing, etc.) the first noise cancellation audio output and the second noise cancellation audio output.

Figure 3:
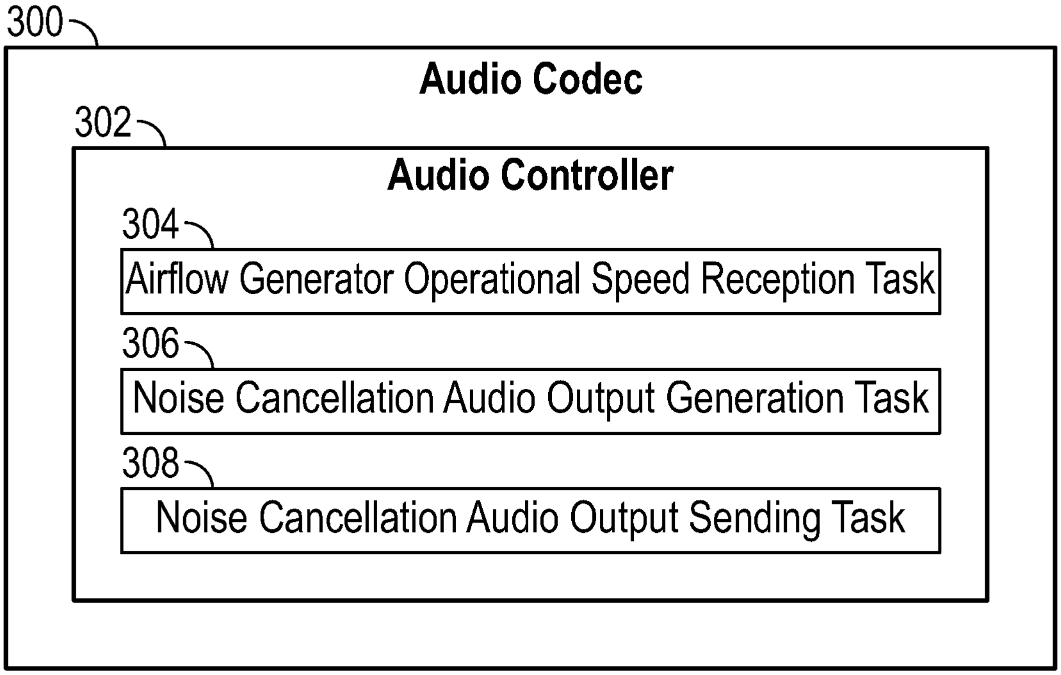
FIG. 3 is a block diagram of an audio coder/decoder (codec) according to some examples.

FIG. 3 is a block diagram of an audio codec 300 for an electronic device including an airflow generator. The audio codec 300 includes an audio controller 302 that performs various tasks. The tasks of the audio controller 302 include an airflow generator operational speed reception task 304 to receive, from a system controller that controls an operational speed of the airflow generator, an indicator of the operational speed of the airflow generator.

The tasks of the audio controller 302 include a noise cancellation audio output generation task 306 to generate a noise cancellation audio output based on the indicator of the operational speed of the airflow generator.

The tasks of the audio controller 302 include a noise cancellation audio output sending task 308 to send the noise cancellation audio output to an audio output device to mitigate noise produced by the airflow generator.

Figure 4:
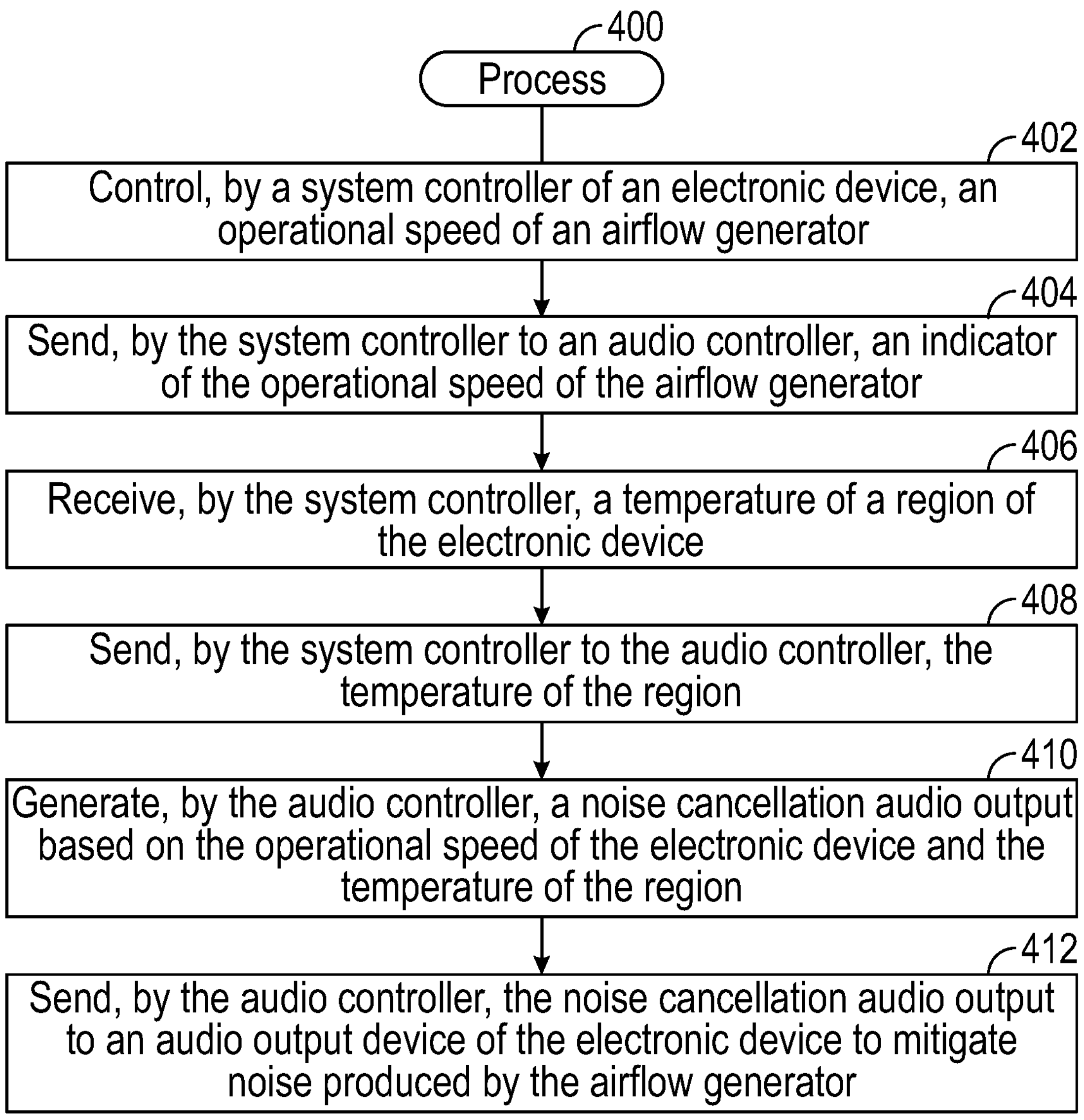
FIG. 4 is a flow diagram of a process according to some examples.

FIG. 4 is a flow diagram of a process 400 according to some examples. The process 400 includes controlling (at 402), by a system controller of an electronic device, an operational speed of an airflow generator.

The process 400 includes sending (at 404), by the system controller to an audio controller, an indicator of the operational speed of the airflow generator.

The process 400 includes receiving (at 406), by the system controller, a temperature of a region of the electronic device.

The process 400 includes sending (at 408), by the system controller to the audio controller, the temperature of the region.

The process 400 includes generating (at 410), by the audio controller, a noise cancellation audio output based on the operational speed of the electronic device and the temperature of the region.

The process 400 includes sending (at 412), by the audio controller, the noise cancellation audio output to an audio output device of the electronic device to mitigate noise produced by the airflow generator.

Tasks of the system controller 104 and the active acoustic noise suppression codec 110 may be performed by machine-readable instructions. The machine-readable instructions can be stored in a non-transitory machine-readable or computer-readable storage medium, and the machine-readable instructions are executable by a processing resource (e.g., the system controller 104 and/or the active acoustic noise suppression codec 110 and/or another processing resource) to perform specified tasks. A storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:

an audio output device;

an airflow generator to generate an airflow;

a system controller to control an operational speed of the airflow generator; and an audio controller to:

generate a noise cancellation audio output based on an indicator of the operational speed of the airflow generator provided from the system controller to the audio controller, wherein the noise cancellation audio output is generated without using an audio sensor to measure noise produced by the airflow generator; and send the noise cancellation audio output to the audio output device to mitigate noise produced by the airflow generator.

2. The electronic device of claim 1, wherein the indicator of the operational speed of the airflow generator comprises information of a frequency of operation of the airflow generator.

3. The electronic device of claim 1, wherein the airflow generator comprises a fan, and wherein the indicator of the operational speed of the airflow generator comprises information of a frequency of rotation of the fan.

4. The electronic device of claim 1, wherein the system controller is to control the operational speed of the airflow generator by adjusting a pulse width modulation (PWM) of a signal provided to the airflow generator.

5. The electronic device of claim 1, wherein the audio controller is to:

in response to the indicator of the operational speed of the airflow generator, access mapping information that maps different airflow generator operational speeds to respective representations of noise cancellation audio outputs, wherein the operational speed of the airflow generator indicated by the indicator is mapped by the mapping information to the noise cancellation audio output sent to the audio output device.

6. The electronic device of claim 5, comprising a storage to store the mapping information, wherein the storage is pre-populated with the mapping information.

7. The electronic device of claim 6, wherein the mapping information was derived based on empirical data comprising noise information collected by an audio sensor due to different operational speeds of the airflow generator.

8. The electronic device of claim 1, wherein the system controller is to provide first temperature information to the audio controller, and wherein the audio controller is to generate the noise cancellation audio output further based on the first temperature information.

9. The electronic device of claim 8, wherein the first temperature information indicates a first temperature in a region of the electronic device.

10. The electronic device of claim 9, wherein the audio controller is to:

in response to the indicator of the operational speed of the airflow generator and the first temperature information, access mapping information that maps different combinations of airflow generator operational speeds and temperatures to respective representations of noise cancellation audio outputs, wherein the operational speed of the airflow generator indicated by the indicator and the temperature of the first temperature information are mapped by the mapping information to the noise cancellation audio output sent to the audio output device.

11. The electronic device of claim 9, wherein the region is a first region of the electronic device, and wherein the system controller is to provide second temperature information of a second temperature in a second region of the electronic device to the audio controller, and wherein the audio controller is to generate the noise cancellation audio output further based on the second temperature information.

12. The electronic device of claim 11, wherein the first temperature maps to a first noise cancellation audio output, and the second temperature maps to a second noise cancellation audio output, and wherein the audio controller is to:

generate the noise cancellation audio output by combining the first noise cancellation audio output and the second noise cancellation audio output.

13. An audio coder/decoder (codec) for an electronic device comprising an airflow generator, the audio codec comprising:

an audio controller to:

receive, from a system controller that controls an operational speed of the airflow generator, an indicator of the operational speed of the airflow generator;

generate a noise cancellation audio output based on the indicator of the operational speed of the airflow generator, wherein the noise cancellation audio output is generated without using an audio sensor to measure noise produced by the airflow generator; and send the noise cancellation audio output to an audio output device to mitigate noise produced by the airflow generator.

14. The audio codec of claim 13, wherein the audio controller is to:

receive information of region temperatures of different regions of the electronic device;

determine different noise cancellation audio outputs for the region temperatures of the different regions; and combine the different noise cancellation audio outputs to generate the noise cancellation audio output sent to the audio output device.

15. A method comprising:

controlling, by a system controller of an electronic device, an operational speed of an airflow generator;

sending, by the system controller to an audio controller, an indicator of the operational speed of the electronic device;

receiving, by the system controller, a temperature of a region of the electronic device;

sending, by the system controller to the audio controller, the temperature of the region;

generating, by the audio controller, a noise cancellation audio output based on the operational speed of the electronic device and the temperature of the region, wherein the noise cancellation audio output is generated without using an audio sensor to measure noise produced by the airflow generator; and sending, by the audio controller, the noise cancellation audio output to an audio output device of the electronic device to mitigate noise produced by the airflow generator.

* * * * *